United States Patent [19]

Shah

[11] 4,198,079
[45] Apr. 15, 1980

[54] HOSE COUPLING JOINT

[75] Inventor: Atul Shah, Euclid, Ohio

[73] Assignee: Parker-Hannifin Corporation, Cleveland, Ohio

[21] Appl. No.: 955,037

[22] Filed: Oct. 26, 1978

[51] Int. Cl.² ............................................ F16L 33/22
[52] U.S. Cl. .................................... 285/245; 285/259
[58] Field of Search ............... 285/255, 245, 242, 259, 285/247, 251

[56] References Cited

U.S. PATENT DOCUMENTS

| 270,065 | 1/1883 | Hickman | 285/245 |
|---|---|---|---|
| 578,983 | 3/1897 | Green | 285/259 X |
| 1,446,489 | 2/1923 | Vivarttas | 285/245 X |
| 3,032,358 | 5/1962 | Rolston | 285/247 |
| 3,177,016 | 4/1965 | Holmgren | 285/259 X |
| 3,653,692 | 4/1972 | Henson | 285/242 |
| 3,788,676 | 1/1974 | Lossie | 285/247 |

FOREIGN PATENT DOCUMENTS

| 684421 | 4/1964 | Canada | 285/245 |
|---|---|---|---|
| 810335 | 8/1951 | Fed. Rep. of Germany | 285/251 |
| 985190 | 3/1951 | France | 285/251 |
| 619479 | 3/1949 | United Kingdom | 285/251 |

Primary Examiner—Thomas F. Callahan
Attorney, Agent, or Firm—James A. Baker

[57] ABSTRACT

A coupling joint for thermoplastic hose comprising a nipple having annular ribs of approximately the same diameter as the hose I.D., for easy insertion into the hose, and a nut of rigid material threaded over the hose O.D. and radially opposite the ribs. The nut has a rounded tapered thread that deforms the hose material to fill the thread and to cause the I.D. of the hose to fill the spaces between the annular ribs. The nipple has a cylindrical portion at its end and the nut has a counterbore at its forward end and the hose is lightly gripped therebetween to avoid sudden stress concentration on the hose at the first rib.

5 Claims, 3 Drawing Figures

HOSE COUPLING JOINT

BACKGROUND OF THE INVENTION

Reinforced hoses of thermoplastic materials, such a hose with a nylon core tube, stranded thermoplastic reinforcement of nylon or dacron, and a sheath of polyster or polyurethane have come into widespread use in recent years for applications, such as for conducting refrigerant fluid in automotive air conditioning systems, where conventional reinforced hoses of synthetic rubbers are not suitable because of deterioration by heat, permeability by the fluid conveyed, and other reasons. Permeability by the refrigerant fluid is especially undesirable because of the adverse effect the fluid has on the earth's ozone layer.

Such hoses of reinforced thermoplastics are difficult to couple and seal with reusable hose couplings because of the nature of the thermoplastic core tube materials, particularly when the cost of the couplings must be kept low, as is the case for automotive installations. It is also highly desirable that all parts of such automotive air conditioning system couplings be reusable even though the hose itself may need to be replaced or cut back so the coupling grips on a different section of the hose. In the past reusable couplings for thermoplastic hoses have been provided but have disadvantages that are overcome by the present invention.

For example, U.S. Pat. No. 3,032,358 has parts with complicated machinings, requires separate elastomeric sealing rings, has sharp threads on the nipple and socket that may damage the hose and limit the number of times the joint may be disassembled. U.S. Pat. No. 270,065 is obviously for soft rubber hose and low pressures and would be incapable of gripping and sealing hose of thermoplastic material at working pressures in the range of 200 to 500 PSI and up to 2500 PSI burst strength.

SUMMARY OF THE INVENTION

The joint of the present invention includes a tubular nipple with a series of annular ribs on its outer surface that is inserted into the end of hose having a thermoplastic core tube, a stranded reinforcement and a sheath, and a nut having a rounded taper thread threaded onto the outer surface of the hose. The O.D. of the ribs is substantially the same as the I.D. of the core tube so that the nipple may be easily inserted therein and the tapered threads are of a minor diameter such that they will squeeze the hose against the ribs and cause the core tube to seal against the ribs and deform into the grooves between the ribs for high gripping strength while yet maintaining as much as one-half of the original wall thickness of the core tube radially outwardly of the ribs so as not to cause pinch through or excessive weakening of the core tube.

The nut has a cylindrical counterbore at the larger end of the thread that is axially in advance of a cylindrical end portion of the nipple and of larger diameter than the ribs and of the initial O.D. of the hose. The counterbore and cylindrical portion snugly accomodate displaced hose material so that there are no bulges of hose material on either its inner or outer diameters and provide an initial semi-rigid grip upon the hose to prevent flexing of the hose externally of the joint to concentrate stresses at the first rib, which might otherwise lead to early fracturing of the core tube at the first rib.

DETAIL DESCRIPTION

Figure 1:
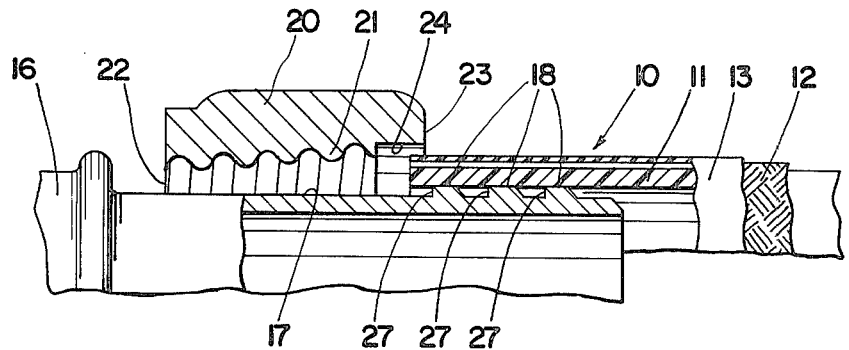
FIG. 1 is a fragmentary cross section showing the nipple inserted into the hose and before the nut is threaded onto the hose.

As shown in FIG. 1 the hose 10 has a core tube 11 of thermoplastic material, such as a polyamide, urethane, polyester, or the like with a hardness that may range from Rockwell 40 D to 80 D, for example. Over the core tube there may be braided or spirally wrapped layer of stranded reinforcement 12 such as polyamide or polyester and over the reinforcement there may be a sheath or cover 13 comprising a thin layer of an elastomeric thermosetting material such as a synthetic rubber or a thin layer of another thermoplastic such as polymide, polyester, polyurethane, or the like.

A metallic nipple 16 has a cylindrical portion 17 and toward its end has a plurality of annular radially outwardly extending ribs 18 that in radial height may be from one half to the full initial wall thickness of core tube 11 and whose outer diameter may be in the range of 0.010" smaller or greater than the initial inner diameter of core tube 11 so that the nipple may be easily manually inserted into the core tube as shown in FIG. 1.

The joint includes a rigid nut 20 that may be of metal or plastic and which has a tapered thread 21 whose crests and roots are rounded as shown. The thread taper has its small diameter at the trailing end 22 of the nut and its larger diameter toward the forward edge 23 of nut where it merges with a cylindrical counterbore 24 whose diameter is substantially the same as the largest diameter of the thread groove.

Figure 2:
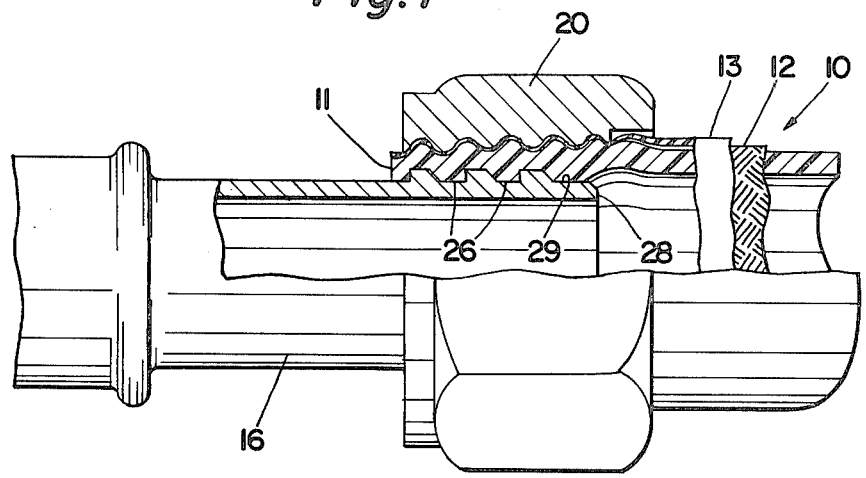
FIG. 2 is a partial section view showing the completed joint.
Figure 3:
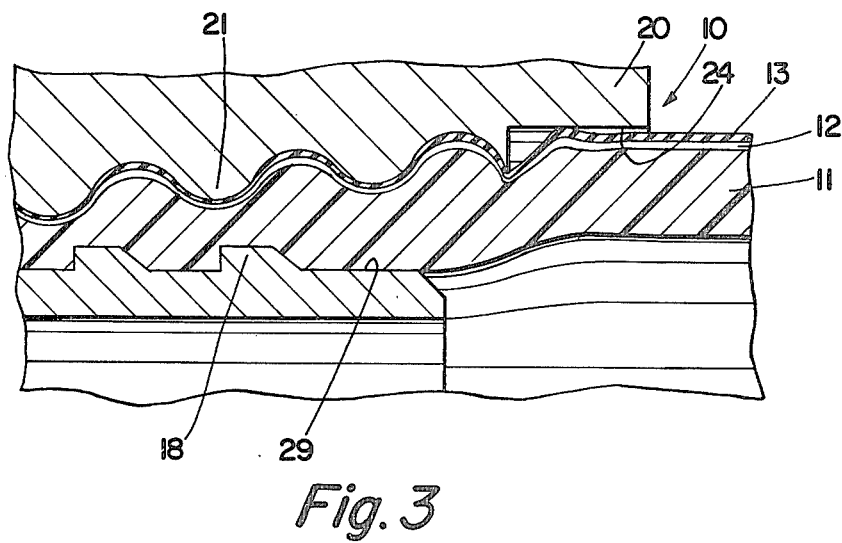
FIG. 3 is a fragmentary section view of the joint.

When the nut is threaded upon the hose 10 from its position in FIG. 1 to its position in FIG. 2, the rounded threads press the hose into sealing contact with the annular ribs 18 and also deforms the core tube material into the grooves between ribs 18 and into contact with the bottom 26 of such grooves so that the core tube will be firmly gripped by the substantially vertical rear surfaces 27 of the ribs to provide high resistance to pullout of the hose from the joint.

The radially outer portion of the hose, includes the sheath 13 and reinforcement 12 deforms into the grooves of nut thread 21 to fill the same and provide additional resistance to pullout of the hose. Because the threads are well rounded there is no danger of the sheath and reinforcement being cut through by the thread. In the final position of the nut the rounded threads are opposite all the ribs 18 and extend axially beyond the ribs in both directions to assure that the core tube will be deformed into firm contact with the nipple forwardly of the first rib 18 and rearwardly of the last rib 18. As shown in FIG. 2, some of the hose material deforms into nut counterbore 24 to contact the wall thereof. This prevents unsightly bulging of the hose exteriorly of the nut and also provides a relatively light grip on the hose forwardly of the threads 21. The counterbore 24 is forwardly of the end 28 of the nipple so that some flexing of the hose may occur forwardly of the end of the nipple.

Rearwardly from counterbore 24 the hose is gripped with increasing tightness by the rounded threads forward of first rib 18 and the core tube is deformed into contact with cylindrical portion 29 of the nipple forwardly of the first rib, all of which provides an increasing gripping or restraint of the hose so that flexing of the hose externally of the nut will be gradually dissipated without high stress concentration prior to the tight grip provided at the first rib 18 and thus provide for longer life of the hose by guarding against early fracture due to abrupt termination of flexure strains at the first rib.

In a typical hose joint, the core tube 11 may be of 6—6 polyamide of ⅜" I.D., 0.075" wall, with a braided polyamide reinforcement of 640 denier and a plastic sheath of about 0.030" thickness, with the total wall thickness of the hose being about 0.090". The cylindrical portion 17 of the nipple is about 5/16" in diameter and the rib height is about 1/32". The minor diameter of the nut thread at its small end is about 0.420" and at its large end is about 0.480" with the thread taper being about 2°-18' on a side, the thread depth being about 0.050" and the pitch about eight threads per inch. With parts as just described the hose will have a burst strength of about 6000 PSI, will withstand a pull of about 800 lbs. without damage at the joint and will withstand at least 200,000 cycles of impulse pressure testing from 0 to 500 PSI.

In some forms the invention either or both the reinforcement and sheath may be omitted, in which case either the core tube may be increased in thickness accordingly or the diameter of the nut thread and counterbore may be decreased in diameter accordingly.

I claim:

1. A hose coupling joint comprising a thermoplastic hose, an inner tubular member, and a nut, said inner tubular member having a plurality of spaced annular circumferentially continuous radially outwardly projecting ribs of substantially uniform outer diameter inserted into an end of said hose, said inner tubular member having a first cylindrical surface disposed between a forwardmost one said ribs and a forwardmost end of said inner tubular member, said nut having a tapered internal thread with rounded crests threaded over the exterior of said hose end, said thread being radially opposite all of said ribs and holding said hose in tight sealing engagement with said ribs, said tapered threads overlapping said first cylindrical surface and holding said hose end in tight sealing engagement therewith, said tapered thread having its largest diameter forwardly of said ribs and opposite said first cylindrical surface, said nut having a smooth counterbore adjacent said large diameter end of said tapered thread to receive hose material deformed radially outwardly forwardly of said large end of said tapered thread, and said counterbore being forwardly of said first cylindrical surface of said tubular member and being of a diameter slightly larger than the initial outer diameter of said hose.

2. The joint of claim 1 in which said hose comprises a core tube of thermoplastic material, a fibrous reinforcement over the core tube, and a tubular cover of flexible deformable material, said thread being of a depth to receive cover material, reinforcement material and core tube material deformed thereinto when the nut is in position to hold said hose in tight sealing engagement with the ribs as aforesaid.

3. A hose coupling joint comprising a thermoplastic hose, an inner tubular member, and a nut, said inner tubular member having a plurality of spaced circumferentially continuous radially outwardly projecting ribs of substantially uniform outer diameter inserted into an end of said hose, said inner tubular member having a first cylindrical surface disposed between a forwardmost one said ribs and a forwardmost end of said inner tubular member, said nut having a tapered internal thread with rounded crests threaded over the exterior of said hose end, said thread being radially opposite all of said ribs and holding said hose in tight sealing engagement with said ribs, said tapered threads overlapping said first cylindrical surface and holding said hose end in tight sealing engagement therewith, said tapered thread having its largest diameter forwardly of said ribs and opposite said first cylindrical surface, said tubular member having a second cylindrical surface rearwardly of said ribs, said second cylindrical surface being of substantially the same diameter as said first cylindrical surface, said thread overlaps said second cylindrical surface and holds said hose end in tight sealing engagement therewith, said nut having a smooth counterbore adjacent said large diameter end of said tapered thread to receive hose material deformed radially outwardly forwardly of said large end of said tapered thread, and said counterbore being forwardly of said first cylindrical surface of said tubular member and being of a diameter slightly larger than the initial outer diameter of said hose.

4. The joint of claim 3 in which said hose includes a core tube of thermoplastic material, at least one layer of reinforcement over the core tube, and a cover over said reinforcement, and said ribs project radially outwardly a distance between about onehalf and the full initial thickness of said core tube.

5. The joint of claim 3 in which said inner tubular member includes a cylindrical surface disposed between adjacent ones of said ribs, and said last mentioned cylindrical surface is of substantially the same diameter as said first and second cylindrical surfaces.

* * * * *

UNITED STATES PATENT AND TRADEMARK OFFICE
CERTIFICATE OF CORRECTION

PATENT NO. : 4,198,079
DATED : April 15, 1980
INVENTOR(S) : Atul Shah

It is certified that error appears in the above—identified patent and that said Letters Patent is hereby corrected as shown below:

In column 3, line 32, after "spaced", delete "annular"

Signed and Sealed this

Tenth Day of June 1980

[SEAL]

Attest:

Attesting Officer

SIDNEY A. DIAMOND

Commissioner of Patents and Trademarks